United States Patent
Naganuma

(10) Patent No.: US 8,927,168 B2
(45) Date of Patent: Jan. 6, 2015

(54) FUEL CELL SYSTEM CONTROL DURING LOW EFFICIENCY OPERATION

(75) Inventor: Yoshiaki Naganuma, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 588 days.

(21) Appl. No.: 13/259,841

(22) PCT Filed: Jul. 30, 2009

(86) PCT No.: PCT/JP2009/063567
§ 371 (c)(1),
(2), (4) Date: Sep. 23, 2011

(87) PCT Pub. No.: WO2011/013226
PCT Pub. Date: Feb. 3, 2011

(65) Prior Publication Data
US 2012/0015270 A1 Jan. 19, 2012

(51) Int. Cl.
*H01M 8/04* (2006.01)
(52) U.S. Cl.
CPC ...... *H01M 8/04753* (2013.01); *H01M 8/04455* (2013.01); *H01M 8/0432* (2013.01); *H01M 8/04395* (2013.01); *H01M 8/04559* (2013.01); *H01M 8/04589* (2013.01); *H01M 8/04888* (2013.01); *Y02E 60/50* (2013.01)
USPC ............ 429/430; 429/431; 429/432; 429/443

(58) Field of Classification Search
CPC .......... H01M 8/0432; H01M 8/04395; H01M 8/04455; H01M 8/04544–8/04559; H01M 8/04589; H01M 8/04753
USPC ........................ 429/430, 431, 432, 443, 444
See application file for complete search history.

(56) References Cited

U.S. PATENT DOCUMENTS

| | | |
|---|---|---|
| 2008/0311449 A1* | 12/2008 | Kaito ............................ 429/22 |
| 2009/0098426 A1* | 4/2009 | Tsuchiya et al. ............... 429/23 |
| 2010/0159342 A1 | 6/2010 | Imanishi et al. |
| 2010/0227240 A1* | 9/2010 | Manabe et al. ............... 429/442 |

FOREIGN PATENT DOCUMENTS

| | | | |
|---|---|---|---|
| JP | 2004-146144 A | 5/2004 | |
| JP | 2004-152532 A | 5/2004 | |
| JP | 2004-327159 A | 11/2004 | |
| JP | 2007-027062 A | 2/2007 | |

(Continued)

OTHER PUBLICATIONS

International Search Report of PCT/JP2009/063567 mailed Nov. 10, 2009.

*Primary Examiner* — Edu E Enin-Okut
(74) *Attorney, Agent, or Firm* — Kenyon & Kenyon LLP

(57) ABSTRACT

Provided is a fuel cell system including: a fuel cell which generates power by an electrochemical reaction between an oxidant gas supplied to an oxidant gas flow path and a fuel gas supplied to a fuel gas flow path; and a controller which adjusts an amount of the oxidant gas supplied to the fuel cell and a voltage of the fuel cell. The controller has an obstruction degree determining unit which determines a degree of obstruction of the oxidant gas flow path based on a stoichiometric ratio of the oxidant gas and the voltage of the fuel cell during a low-efficiency operation in which the stoichiometric ratio of the oxidant gas is reduced from the stoichiometric ratio of the oxidant gas during a normal operation and heat discharged from the fuel cell is increased from that during the normal operation. This improves stability of the low-efficiency operation of the fuel cell system.

5 Claims, 12 Drawing Sheets

(56) References Cited

FOREIGN PATENT DOCUMENTS

| JP | 2007-141744 A | 6/2007 |
| JP | 2007-184202 A | 7/2007 |
| JP | 2007-188665 A | 7/2007 |
| JP | 2008-103201 A | 5/2008 |
| WO | 2007/046545 A1 | 4/2007 |
| WO | WO 2007046545 A1 * | 4/2007 | ............ H01M 8/10 |
| WO | 2009005169 A1 | 1/2008 |
| WO | 2008/050881 A1 | 5/2008 |

* cited by examiner

FUEL CELL SYSTEM CONTROL DURING LOW EFFICIENCY OPERATION

This is a 371 national phase application of PCT/JP2009/063567 filed Jul. 30, 2009, the contents of which are incorporated herein by refence.

TECHNICAL FIELD

The present invention relates to control of a fuel cell system during a low-efficiency operation.

BACKGROUND ART

Many fuel cell systems use fuel cells in which a fuel electrode and an oxidant electrode are placed on respective sides of an electrolytic membrane, power is generated by an electrochemical reaction between hydrogen supplied to the fuel electrode and oxygen in the air supplied to the oxidant electrode, and water is produced at the oxidant electrode.

When such a fuel cell is operated at a temperature which is lower than a normal operation temperature, a predetermined voltage and a predetermined current cannot be output, and, thus in many cases a warm-up operation is executed after startup, until the normal operation temperature is reached. As a method of the warm-up operation, there is proposed a low-efficiency operation method in which the amount of supply of air supplied to the fuel cell is set lower than the normal amount of supply, and an air stoichiometric ratio is set lower than the air stoichiometric ratio used during normal operation (for example, refer to Patent Literature 1). The air stoichiometric ratio refers to a ratio of the actual amount of air with respect to a theoretically necessary amount of air corresponding to the load of the fuel cell, and the air stoichiometric ratio during normal operation is usually about 2.0. When the air stoichiometric ratio is set to be low and the low-efficiency operation is executed, the air concentration overvoltage becomes larger than that during normal operation, and, thus, of the energy that can be extracted from the reaction of hydrogen and oxygen, the thermal loss (power generation loss) is increased.

In addition, there is also proposed a method in which, when the fuel cell is started up under a low temperature environment, in order to stably execute the warm-up operation of the fuel cell and inhibit degradation due to insufficient supply of gas, the air stoichiometric ratio is changed between 2.0, which is a standard value, and 1.8; a hydrogen stoichiometric ratio is changed between 1.2, which is a standard value, and 1.05; a cell stoichiometric ratio of each unit cell is calculated based on a percentage of change of the cell voltage during this process; and, when the stoichiometric ratio of each unit cell is lower than a predetermined value, the amounts of supply of air and hydrogen are increased (for example, refer to Patent Literature 2).

RELATED ART REFERENCES

Patent Literature

Patent Literature 1: JP 2007-141744 A
Patent Literature 2: JP 2007-184202 A

DISCLOSURE OF INVENTION

Technical Problem

Upon execution of the low-efficiency operation in which the flow rate of air supplied to the fuel cell is reduced and the air stoichiometric ratio is reduced, hydrogen ions, electrons, and oxygen are bonded at the air electrode and water is produced, and the hydrogen ions and electrons are re-bonded to produce hydrogen according to the insufficiency in the air flow rate. The hydrogen produced at the air electrode due to re-bonding of separated hydrogen ions and electrons is called pumping hydrogen. The water and the pumping hydrogen produced at the air electrode are discharged to the atmosphere by exhaust air from the air electrode.

The pumping hydrogen is discharged to the atmosphere after being diluted by the air, but when the flow rate of air supplied to the air electrode is reduced because of the low-efficiency operation, the dilution may become insufficient, and there had been a problem in that the hydrogen concentration in the exhaust air becomes high. In addition, because the flow rate of the air is reduced, there are cases where the produced moisture cannot be sufficiently discharged, the moisture remains in the air flow path, and the air flow path is obstructed by the moisture. When the obstruction of the air flow path is caused by the produced moisture, there is a problem in that degradation of the fuel cell occurs around the obstructed air flow path.

In the related art of Patent Literature 1, even when the obstruction of the air flow path occurs during the low-efficiency operation, the obstruction cannot be determined. The related art described in Patent Literature 2 cannot be applied to the low-efficiency operation in which the flow rate of air is reduced, and thus, the obstruction of the air flow path during the low-efficiency operation cannot be determined.

An advantage of the present invention is that stability of the low-efficiency operation is improved in a fuel cell system.

Solution to Problem

According to one aspect of the present invention, there is provided a fuel cell system comprising a fuel cell which generates power by an electrochemical reaction between oxidant gas supplied to an oxidant gas flow path and fuel gas supplied to a fuel gas flow path, and a controller which adjusts a flow rate of the oxidant gas supplied to the fuel cell and a voltage of the fuel cell, wherein the controller comprises an obstruction degree determining unit which determines a degree of obstruction of the oxidant gas flow path based on a stoichiometric ratio of the oxidant gas and the voltage of the fuel cell during a low-efficiency operation in which the stoichiometric ratio of the oxidant gas is reduced from a stoichiometric ratio of the oxidant gas during a normal operation and discharge heat from the fuel cell is increased from that during normal operation.

According to another aspect of the present invention, preferably, in the fuel cell system, the obstruction degree determining unit determines the degree of obstruction of the oxidant gas flow path based on a voltage difference between a voltage of the fuel cell at normal times corresponding to the stoichiometric ratio of the oxidant gas and an operation voltage of the fuel cell.

According to another aspect of the present invention, preferably, the fuel cell system further comprises a temperature sensor which obtains a temperature of the fuel cell, a voltage sensor which obtains the voltage of the fuel cell, a current sensor which obtains an output current of the fuel cell, and a flow rate obtaining unit which obtains a flow rate of the oxidant gas, wherein the controller comprises a reference current-voltage characteristic calculating unit which calculates a reference current-voltage characteristic of the fuel cell based on the temperature of the fuel cell obtained by the temperature sensor, a stoichiometric ratio calculating unit which calculates the stoichiometric ratio of the oxidant gas based on the flow rate of the oxidant gas obtained by the flow rate obtaining unit, and an oxidant concentration overvoltage calculating unit which calculates a reference voltage, corresponding to the operation current of the fuel cell obtained by the current sensor, based on the calculated reference current-voltage characteristic, and calculates an oxidant concentration overvoltage by subtracting the operation voltage of the fuel cell obtained by the voltage sensor from the calculated reference voltage, and the obstruction degree determining unit determines the degree of obstruction of the oxidant gas flow path based on the stoichiometric ratio of the oxidant gas and the oxidant concentration overvoltage.

According to another aspect of the present invention, preferably, in the fuel cell system, the obstruction degree determining unit determines the degree of obstruction of the oxidant gas flow path based on a voltage difference between the reference oxidant concentration overvoltage of the fuel cell at normal times corresponding to the stoichiometric ratio of the oxidant gas and the oxidant concentration overvoltage calculated by the oxidant concentration overvoltage calculating unit.

According to another aspect of the present invention, preferably, in the fuel cell system, the controller further comprises an oxidant gas flow path blowing unit which executes, when the voltage difference between the voltage of the fuel cell at normal times corresponding to the stoichiometric ratio of the oxidant gas and the operation voltage of the fuel cell is greater than a predetermined threshold value, a blow operation in which, after the voltage of the fuel cell is increased to transition from the low-efficiency operation to a normal operation, the flow rate of the oxidant gas is increased.

According to another aspect of the present invention, preferably, in the fuel cell system, the controller further comprises an oxidant gas flow path blowing unit which executes, when the voltage difference between the reference oxidant concentration overvoltage of the fuel cell at normal times corresponding to the stoichiometric ratio of the oxidant gas and the oxidant concentration overvoltage calculated by the oxidant concentration overvoltage calculating unit is greater than a predetermined threshold value, a blow operation in which, after the voltage of the fuel cell is increased to transition from the low-efficiency operation to the normal operation, the flow rate of the oxidant gas is increased.

According to another aspect of the present invention, preferably, in the fuel cell system, the oxidant gas is air, the fuel gas is hydrogen, and the controller further comprises a pumping hydrogen amount correcting unit which increases an amount of pumping hydrogen from a theoretical amount of pumping hydrogen to a corrected amount of pumping hydrogen based on the voltage difference between the voltage of the fuel cell at normal times corresponding to the stoichiometric ratio of the oxidant gas and the operation voltage of the fuel cell, a necessary air flow rate calculating unit which calculates a necessary flow rate of dilution air based on the corrected amount of pumping hydrogen corrected by the pumping hydrogen amount correcting unit, and an air flow rate increasing unit which increases the air flow rate to the necessary flow rate of dilution air calculated by the necessary air flow rate calculating unit.

According to another aspect of the present invention, preferably, in the fuel cell system, the oxidant gas is air, the fuel gas is hydrogen, and the controller further comprises a pumping hydrogen amount correcting unit which increases an amount of pumping hydrogen from a theoretical amount of pumping hydrogen to a corrected amount of pumping hydrogen based on the voltage difference between the reference oxidant concentration overvoltage of the fuel cell at normal times corresponding to the stoichiometric ratio of the oxidant gas and the oxidant concentration overvoltage calculated by the oxidant concentration overvoltage calculating unit, a necessary air flow rate calculating unit which calculates a necessary flow rate of dilution air based on the corrected amount of pumping hydrogen corrected by the pumping hydrogen amount correcting unit, and an air flow rate increasing unit which increases the air flow rate to the necessary flow rate of dilution air calculated by the necessary air flow rate calculating unit.

According to another aspect of the present invention, preferably, in the fuel cell system, the obstruction degree determining unit determines the degree of obstruction of the oxidant gas flow path according to a degree of increase of the operation voltage of the fuel cell compared to the voltage of the fuel cell at normal times corresponding to the stoichiometric ratio of the oxidant gas when the stoichiometric ratio of the oxidant gas is less than 1.0. According to another aspect of the present invention, preferably, in the fuel cell system, the obstruction degree determining unit determines the degree of obstruction of the oxidant gas flow path according to a degree of reduction of the oxidant concentration overvoltage calculated by the oxidant concentration overvoltage calculating unit compared to the reference oxidant concentration overvoltage of the fuel cell at normal times corresponding to the stoichiometric ratio of the oxidant gas when the stoichiometric ratio of the oxidant gas is less than 1.0.

Advantageous Effects Of Invention

According to various aspects of the present invention, an advantage is achieved in a fuel cell system in which the stability of the low-efficiency operation is improved.

BEST MODE FOR CARRYING OUT THE INVENTION

Figure 1:
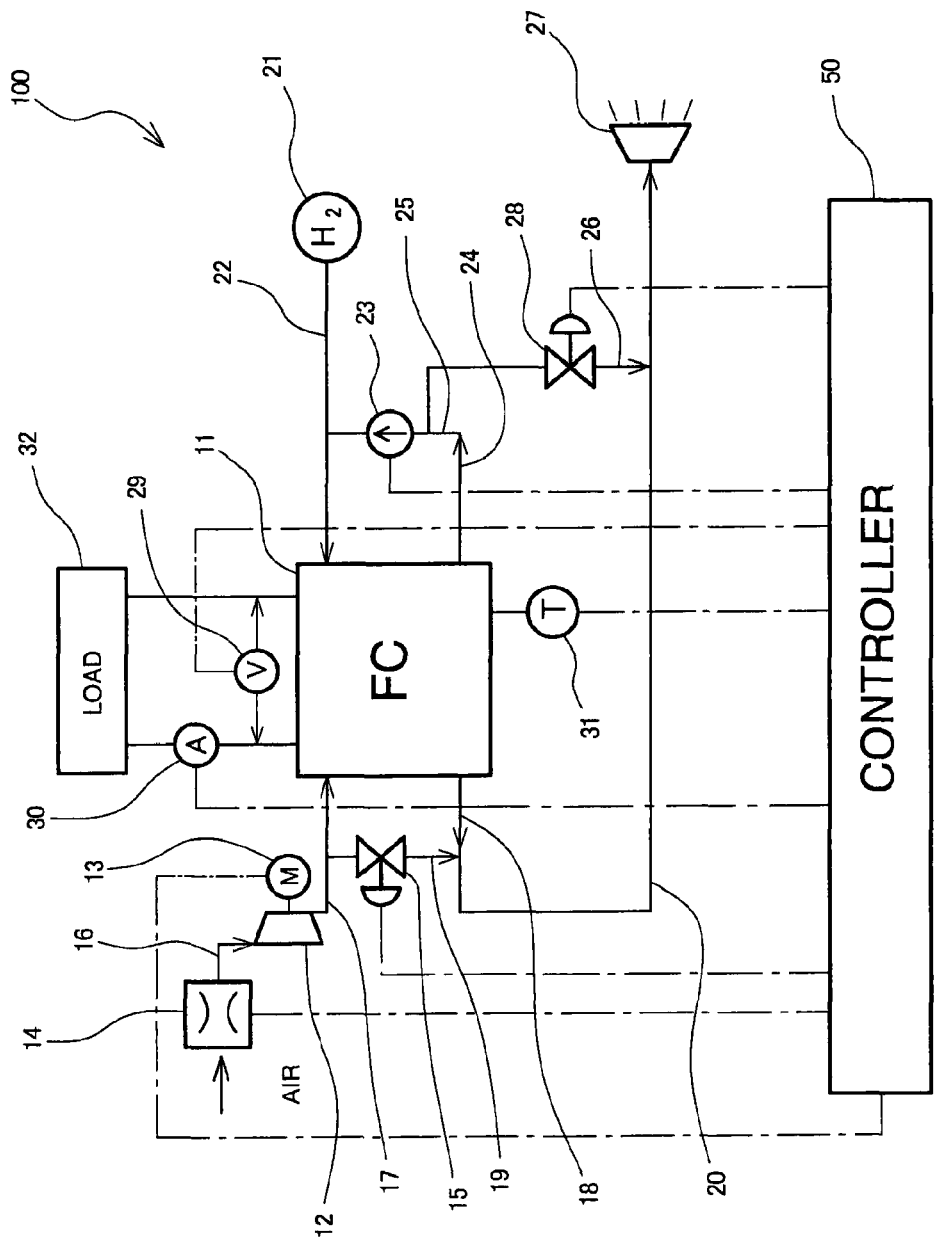
FIG. 1 is a system diagram showing a structure of a fuel cell system according to a preferred embodiment of the present invention.

Preferred embodiments of the present invention will now be described with reference to the drawings. A fuel cell 11 of a fuel cell system 100 according to a preferred embodiment uses air containing oxygen as oxidant gas and hydrogen as fuel gas. The air which is the oxidant gas is taken in from the atmosphere through an air flow rate meter 14 and an air intake passage 16 to an air compressor 12, and output air which is pressurized by the air compressor 12 is supplied from an air supply passage 17 to the fuel cell 11. The air entering the fuel cell 11 reacts with hydrogen supplied from a hydrogen system while passing through the air flow path provided inside the fuel cell 11, and the amount of oxygen is reduced. An amount of product water resulting from the reaction increases in the air flow path in a form of water vapor or water droplets. The air after the reaction in which the amount of moisture is increased is discharged from an air flow path inside the fuel cell 11 to an air discharge passage 18. In addition, a bypass passage 19 is provided such that a part of the intake air is not supplied to the fuel cell 11, but instead is supplied to the air discharge passage 18, and a bypass valve 15 for adjusting a flow rate of the air in the bypass is provided in the bypass passage 19. The air discharge passage 18 and the bypass passage 19 are merged and connected to an exhaust passage 20. The air entering the exhaust passage 20 is discharged through an atmosphere discharge port 27 to the atmosphere. A flow rate of the air flowing into the fuel cell system 100 is adjusted by adjusting a rotational rate of a motor 13 of the air compressor 12.

The hydrogen gas which serves as the fuel gas is stored in a hydrogen gas tank 21. The hydrogen is supplied from the hydrogen gas tank 21 through a hydrogen supply passage 22 to a hydrogen flow path inside the fuel cell 11. A part of the hydrogen entering the hydrogen flow path of the fuel cell 11 is consumed by the power generation, and unconsumed hydrogen is discharged from a hydrogen flow path inside the fuel cell 11 to a hydrogen exit passage 24. The hydrogen gas or the like after the reaction discharged to the hydrogen exit passage 24 is pressurized by a hydrogen pump 23 of a hydrogen circulation passage 25, and is circulated to the hydrogen supply passage 22. When the hydrogen is consumed by the power generation and the hydrogen concentration is reduced, a hydrogen discharge valve 28 is opened, the hydrogen gas after the reaction is discharged from a hydrogen discharge passage 26 to the exhaust passage 20, is diluted by the discharge air, and is discharged to the atmosphere through the atmosphere discharge port 27.

A load 32 is connected to the fuel cell 11, and a voltage sensor 29 which obtains an output voltage from the fuel cell 11 to the load 32 and a current sensor 30 which obtains an output current are provided. In addition, a temperature sensor 31 for obtaining the temperature of the fuel cell 11 is mounted on the fuel cell 11. The motor 13 of the air compressor 12, the bypass valve 15, the hydrogen pump 23, and the hydrogen discharge valve 28 are connected to a controller 50, and operate according to an instruction from the controller 50. In addition, the air flow rate meter 14, the voltage sensor 29, the current sensor 30, and the temperature sensor 31 are also connected to the controller 50 so that each of the obtained signals can be input to the controller 50. The controller 50 is a computer internally including a CPU which executes signal processing and a memory which stores a control program, control data, etc. In FIG. 1, a dot-and-chain line represents a signal line.

Figure 3:
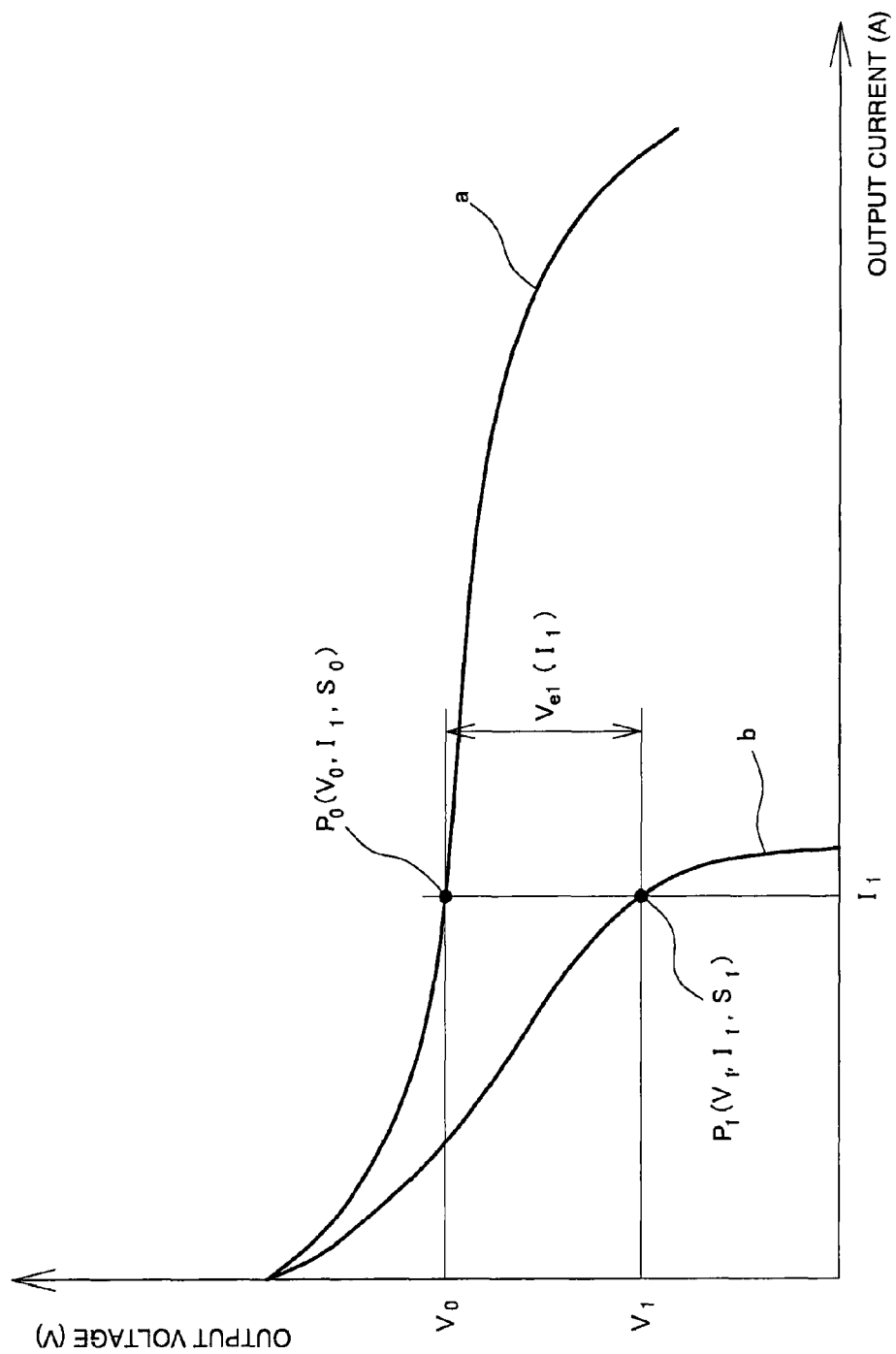
FIG. 3 is a diagram showing current-voltage characteristics of a normal operation and of a low-efficiency operation in a fuel cell system according to a preferred embodiment of the present invention.

Before the operation of the fuel cell system 100 is described, a normal operation and a low-efficiency operation of the fuel cell 11 will be described. The fuel cell 11 is operated by supplying air and hydrogen gas in amounts greater than the amounts of air and hydrogen gas theoretically considered necessary for output power to the load 32. A ratio of the flow rate of air actually supplied to the fuel cell to the amount of air theoretically considered necessary for the output power is called an air stoichiometric ratio, and a ratio of an amount of hydrogen gas actually supplied to the fuel cell to the amount of hydrogen gas theoretically considered necessary for the output power is called a hydrogen gas stoichiometric ratio. In normal operation, the air stoichiometric ratio is usually set to about 1.5 to 2.0 and the hydrogen gas stoichiometric ratio is usually set to about 1.1 to 1.2. In other words, hydrogen gas in an amount of 1.1 to 1.2 times the amount of hydrogen gas theoretically considered necessary for the power output is supplied to the fuel cell 11, and air in an amount 1.5 to 2.0 times the amount theoretically considered necessary for the power output is supplied to the fuel cell 11 for the operation. When the fuel cell 11 is operated with the hydrogen gas and the air at the predetermined stoichiometric ratios in this manner, a relationship between an output current and an output voltage of the fuel cell 11 would be that shown by a curve a of FIG. 3. Even when the air flow rate or the hydrogen gas flow rate changes slightly, the curve a does not change and the output voltage and the output current are determined along the curve a. In this manner, an operation state in which the current-voltage characteristic of the fuel cell 11 is stabilized by supplying the hydrogen gas and air in amounts greater than or equal to the amounts theoretically considered necessary for the power output is normal operation. As shown in FIG. 3, when the output current from the fuel cell 11 is $I_1$, the voltage at the current $I_1$ is a reference voltage $V_0$.

When, on the other hand, the flow rate of air supplied to the fuel cell 11 is reduced from the state of normal operation such that the air stoichiometric ratio is less than 1.0; that is, when the air is supplied in an amount less than the amount of air theoretically considered necessary for the output, the output current-voltage characteristic of the fuel cell 11 changes from the curve a to a curve b. As shown in FIG. 3, during operation with the output current from the fuel cell 11 being $I_1$, the operation voltage is $V_1$, and a voltage difference from the reference voltage $V_0$ is an air concentration overvoltage $Ve_1$. As the air concentration overvoltage $Ve_1$ becomes larger, the loss of the fuel cell 11 becomes larger and the generated heat becomes larger. As described, by reducing the flow rate of air supplied to the fuel cell 11 to reduce the air stoichiometric ratio, it is possible to reduce the efficiency of the fuel cell 11, and the fuel cell 11 can be warmed up by the discharge heat. Such an operation is the low-efficiency operation.

Figure 4:
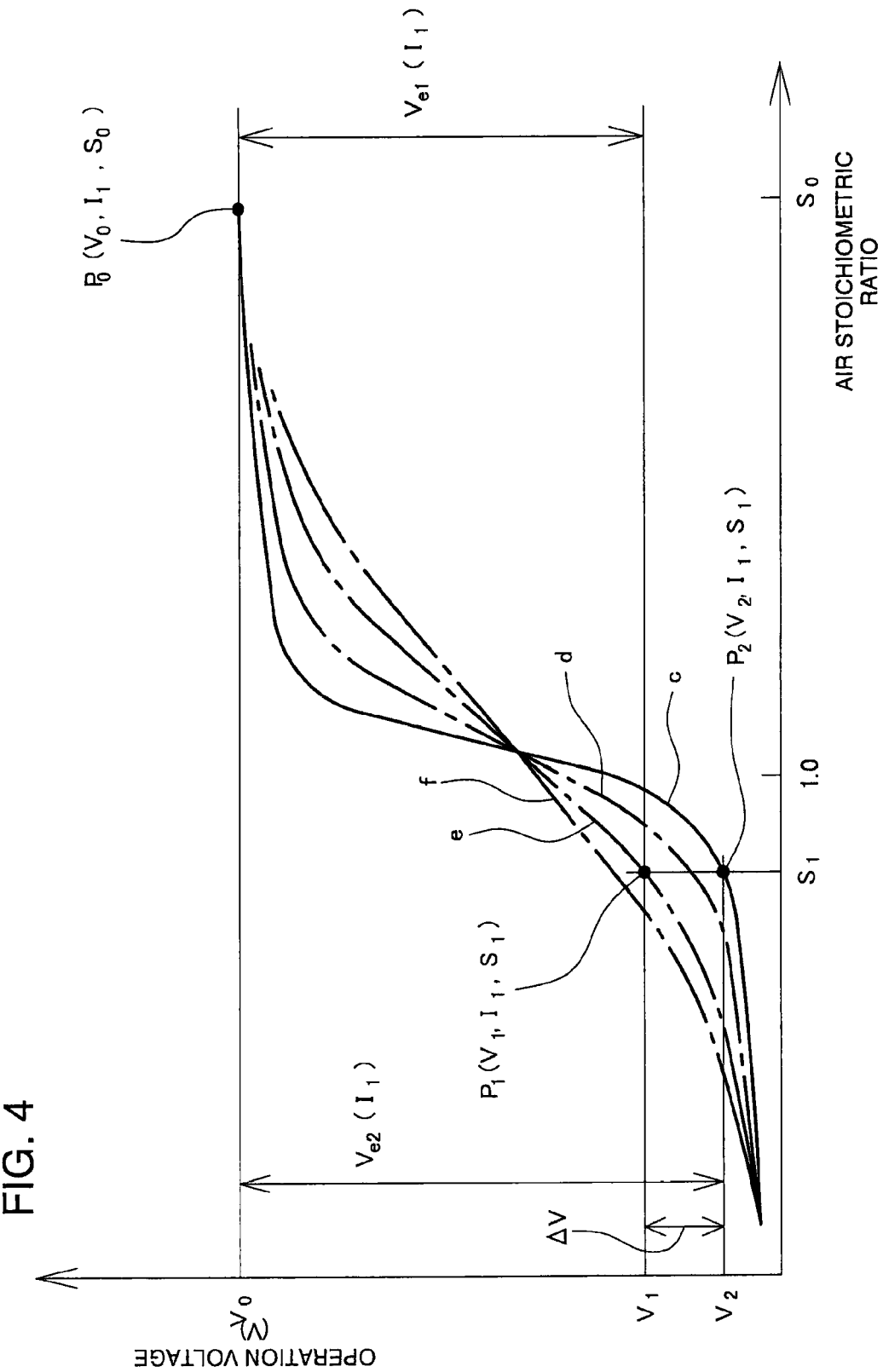
FIG. 4 is a graph showing a change of an operation voltage corresponding to an air stoichiometric ratio in a fuel cell system according to a preferred embodiment of the present invention.

As shown in FIG. 3, when the output current from the fuel cell 11 is fixed at the operation current $I_1$, if the air stoichiometric ratio is reduced from the normal operation state, the operation voltage $V_1$ would be reduced from the reference voltage $V_0$. Curves c to f in FIG. 4 show changes of the operation voltage $V_1$ when the output current from the fuel cell 11 is fixed at the operation current $I_1$ and the air stoichiometric ratio is changed. The curve c represents the change of the operation voltage $V_1$ with respect to the air stoichiometric ratio when there is no water blockage in the air flow path, and curves d to f show changes of the operation voltage $V_1$ with respect to the air stoichiometric ratio when there is water blockage in the air flow path, with the curve d representing a case of a low degree of the water blockage and the curve f representing a case of a high degree of the water blockage.

Figure 5A:
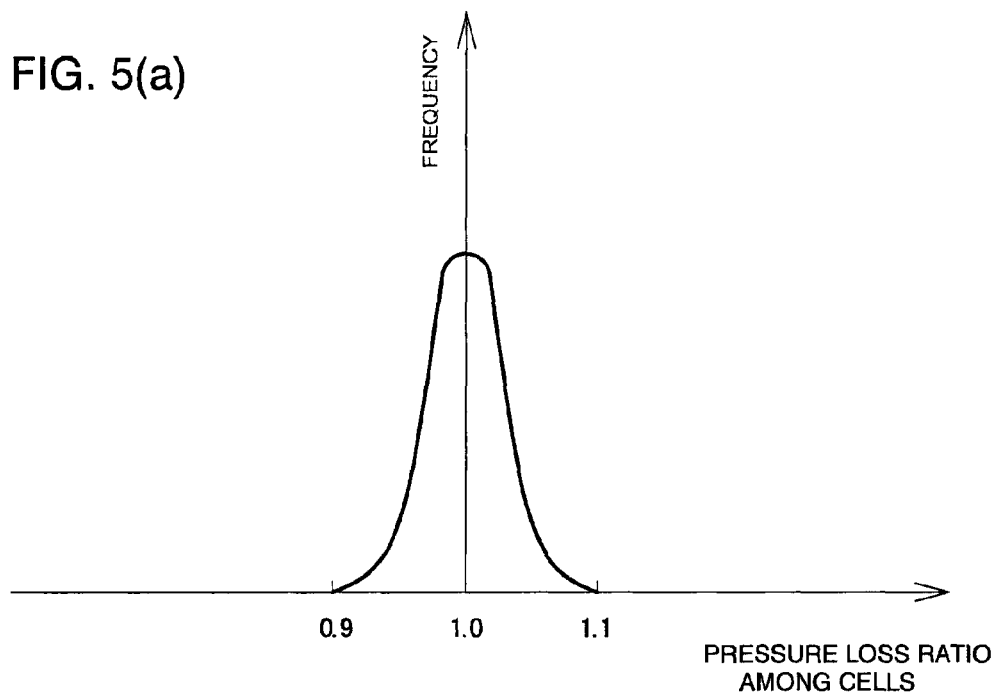
FIG. 5 is a graph showing a change of variation of a pressure loss ratio among cells in a fuel cell according to a preferred embodiment of the present invention.

Theoretically, in the case where the air flows uniformly throughout the cell and flow path, the fuel cell 11 starts power generation when the air stoichiometric ratio becomes 1.0. Therefore, theoretically, when the air stoichiometric ratio is less than or equal to 1.0, the operation voltage $V_1$ is almost zero, and, when the air stoichiometric ratio exceeds 1.0, power generation is started at once in the cells, and the operation voltage $V_1$ changes rapidly from a state of almost zero to the reference voltage $V_0$. However, as shown in FIG. 5(a), even in the normal state with no water blockage, there is a variation in the pressure loss among cells. More specifically, when the average pressure loss is 1.0, there is a variation of about 0.9 to 1.0 for the pressure loss ratio. Because of this, the flow rate of air becomes larger in the cell having a lower pressure loss ratio than the other cells, and, consequently, the air stoichiometric ratio for a single cell reaches 1.0 in a part of the cells before the overall air stoichiometric ratio reaches 1.0, and power generation is started. On the other hand, in cells having a larger pressure loss, even when the overall air stoichiometric ratio reaches 1.0, the air stoichiometric ratio in the single cell does not reach 1.0, and, for example, power generation is started only when the overall air stoichiometric ratio reaches about 1.1. Therefore, in the actual fuel cell 11 in the normal state, the operation voltage $V_1$ with respect to the air stoichiometric ratio would have an S-shape curve with a rapid rise as shown by the curve c in FIG. 4 in which the operation voltage $V_1$ rapidly rises from the air stoichiometric ratio of about 0.9, becomes a voltage very close to the reference voltage $V_0$ around the air stoichiometric ratio of about 1.1, and then gradually increases toward the reference voltage $V_0$.

Figure 5B:
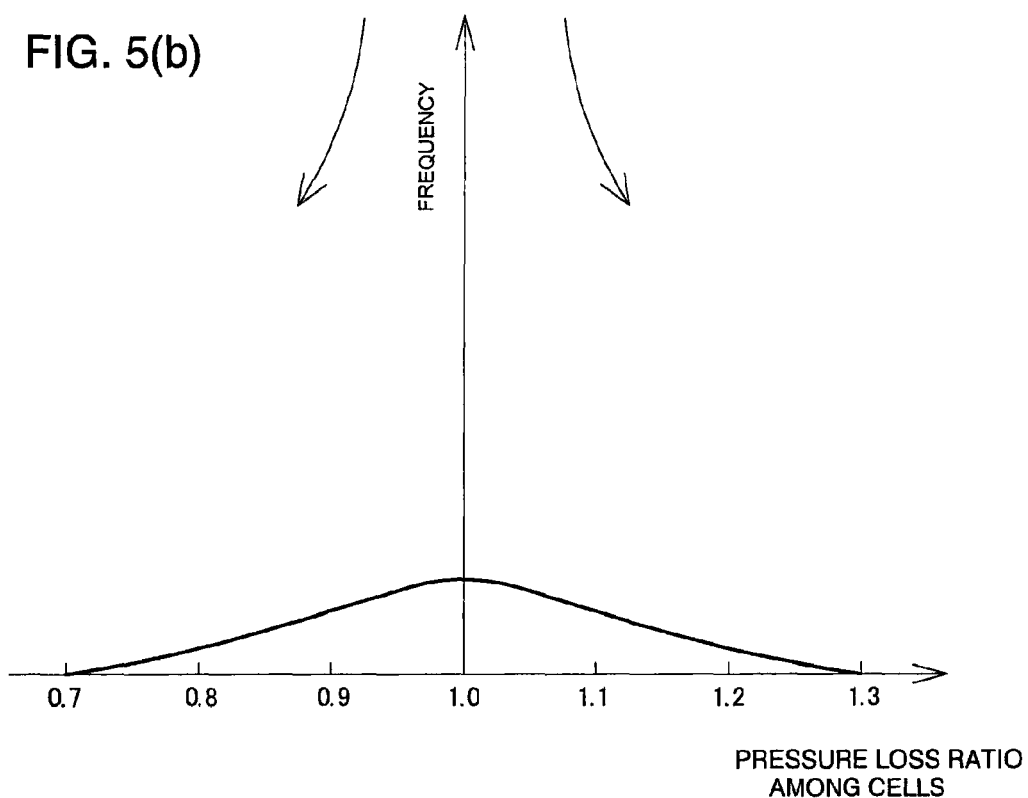

Because the low-efficiency operation is the operation in which the flow rate of the air is reduced compared to the normal operation, the moisture or the water drop produced at the air electrode may not be sufficiently discharged from the air flow path and the water blockage may be caused at a part of the air flow path. In this case, as shown in FIG. 5(b), the variation of the pressure loss ratio among cells is distributed in a range of about 0.7 to about 1.3. Because of this, when the water blockage occurs, for example, even when the air stoichiometric ratio is about 0.7, in a cell having a low pressure loss ratio and in which no water blockage has occurred, the air stoichiometric ratio of the single cell become 1.0 and the power generation is started. On the other hand, in a cell having a large pressure loss ratio among cells in which the pressure loss is increased due to water blockage, for example, the power generation does not start until the air stoichiometric ratio becomes about 1.3. Therefore, when water blockage occurs, the increase in the operation voltage $V_1$ starts from a lower air stoichiometric ratio as compared with the case where there is no water blockage, and the operation voltage $V_1$ reaches near the reference voltage $V_0$ at a higher air stoichiometric ratio than the case where there is no water blockage. As the degree of water blockage is increased, the variation in the pressure loss ratio among cells is also increased. Thus, as the degree of water blockage is increased, the air stoichiometric ratio where the operation voltage $V_1$ starts increasing becomes lower and the stoichiometric ratio where the operation voltage $V_1$ reaches near the reference voltage $V_0$ becomes higher. In other words, the rise of the operation voltage $V_1$ due to the increase in the air stoichiometric ratio becomes more gradual. As shown in FIG. 4, when the output current from the fuel cell 11 is fixed at the operation current $I_1$ and the air stoichiometric ratio is changed, the operation voltage $V_1$ follows an S-shape curve having a gradual rise as shown by curves d to f shown with dot-and-chain lines and having a smaller rise than the curve c showing the change of the operation voltage $V_1$ in a state where there is no water blockage. The higher degree of water blockage, the closer the change of the operation voltage $V_1$ becomes to the curve f, and, the lower the degree of the water blockage, the closer the change of the operation voltage $V_1$ becomes to the curve d.

As shown in FIG. 4, when the water blockage occurs, the operation voltage $V_1$ changes in the above-described manner. Thus, in a region where the air stoichiometric ratio is lower than a value near 1.0, when the fuel cell system is operated with the output current from the fuel cell 11 fixed at the operation current $I_1$, the operation voltage $V_1$ becomes higher as compared with the operation voltage $V_2$ in the normal state with no water blockage, as the degree of water blockage is increased. In addition, when the fuel cell system is operated at a state where the air stoichiometric ratio is larger than a value near 1.0 and is lower than the air stoichiometric ratio $S_0$ of the normal operation, the operation voltage is lower than in the case where there is no water blockage. For the same air stoichiometric ratio, a voltage difference $\Delta V$ between the operation voltage of the normal state with no water blockage and the operation voltage for the case where there is water blockage is increased as the degree of the water blockage is increased.

Figure 2:
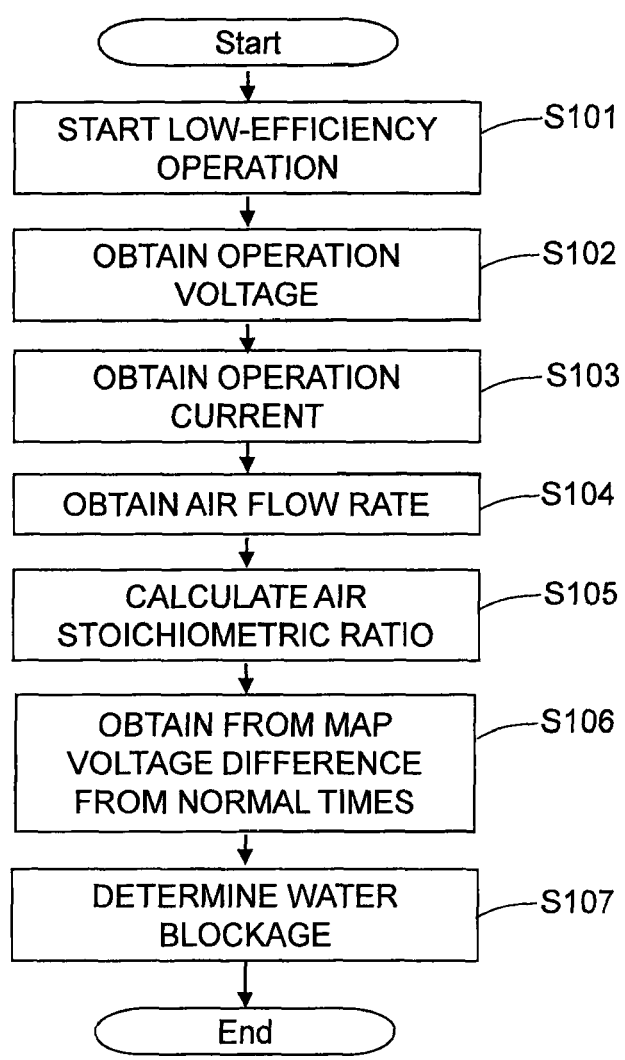
FIG. 2 is a flowchart showing determination of water blockage in a fuel cell system according to a preferred embodiment of the present invention.

The controller 50 starts the above-described low-efficiency operation as shown in step S101 of FIG. 2. As the method of controlling the low-efficiency operation, various methods may be considered, and one method is a method in which air and hydrogen gas in predetermined amounts which are set in advance according to the power which is output at the low-efficiency operation are supplied to the fuel cell to start the operation of the fuel cell 11, and then, the voltage on the side of the load is controlled to fix the operation voltage $V_1$ of the fuel cell 11, and the flow rate of the air is adjusted to achieve the necessary power and to adjust the output current to a predetermined current $I_1$. In this case, the output voltage and the output current of the fuel cell 11 can be set to power which can be consumed by the load at the low-efficiency operation, but the air stoichiometric ratio would deviate from the preset air stoichiometric ratio.

With reference to FIGS. 2-5, there will now be described the determination operation of the water blockage of the air flow path inside the fuel cell 11 when the fuel cell system 100 is operated in the low-efficiency operation. As shown in step S101 of FIG. 2, after the controller 50 starts up the fuel cell 11, the controller 50 starts the low-efficiency operation, and, as shown in step S102 of FIG. 2, the operation voltage $V_1$ of the fuel cell 11 is obtained by the voltage sensor 29 shown in FIG. 1, and, as shown in step S103 of FIG. 2, the operation current $I_1$ of the fuel cell 11 is obtained by the current sensor 30. Then, the controller 50 obtains the intake air flow rate of the fuel cell system 100 by the air flow rate meter 14, as shown in step S104 of FIG. 2. The controller 50 calculates, when the bypass valve 15 is open, the bypass flow rate based on the degree of opening of the bypass valve 15, and sets as the supply air flow rate to the fuel cell 11 a flow rate obtained by subtracting the bypass flow rate from the intake air flow rate. The controller 50 calculates the output power of the fuel cell 11 to the load 32 based on the obtained operation voltage $V_1$ and the obtained operation current $I_1$ as shown in step S105 of FIG. 2, and calculates a theoretical necessary flow rate of air which is theoretically necessary for the output power. The supply air flow rate to the fuel cell 11 is divided by the theoretical necessary flow rate of air, to calculate the operation air stoichiometric ratio $S_1$.

When the controller 50 completes obtaining the operation voltage $V_1$ and calculating the operation air stoichiometric ratio $S_1$, the controller 50 obtains a voltage difference $\Delta V$ between the operation voltage $V_2$ in a normal state where the air stoichiometric ratio is the operation air stoichiometric ratio $S_1$ on the map shown in FIG. 4 and the operation voltage $V_1$, as shown in step S106 of FIG. 2. As shown in step S107 of FIG. 2, when the obtained voltage difference $\Delta V$ is larger than a predetermined threshold value, it is determined that the water blockage has occurred, and, when the voltage difference $\Delta V$ is not larger than the predetermined threshold value, it is determined that the water blockage has not occurred. Alternatively, the controller 50 may determine the degree of water blockage in the air flow path based on the magnitude of the voltage difference $\Delta V$. The degree of water blockage may be determined, for example, by setting a plurality of levels of water blockage levels corresponding to the voltage difference $\Delta V$ and outputting one of the water blockage levels.

In the above-described preferred embodiment, because the water blockage of the air flow path during the low-efficiency operation of the fuel cell 11 can be determined, it is possible to inhibit unstable operation of the fuel cell 11 due to the water blockage.

Next, with reference to FIGS. 6 and 7, another method of determining water blockage of the fuel cell system 100 of the present embodiment will be described. The portions similar to those described above with reference to FIGS. 1-5 are assigned similar reference numerals and will not be described again. In the present embodiment, the water blockage is determined based on a map of an air concentration overvoltage Ve corresponding to the operation air stoichiometric ratio.

As has already been described with reference to FIG. 3, when the fuel cell 11 is operated in the low-efficiency operation at the operation voltage of $I_1$, the operation voltage $V_1$ is lower than the reference voltage $V_0$ when the fuel cell 11 is normally operated with the operation current of $I_1$. The voltage difference between the reference voltage $V_0$ and the operation voltage $V_1$ is the operation air concentration overvoltage $Ve_1$. A current-voltage characteristic of the fuel cell 11 during normal operation shown by the curve a of FIG. 3 and a current-voltage characteristic during low-efficiency operation shown by the curve b change depending on the temperature of the fuel cell 11. Therefore, when the water blockage is to be determined based on the map shown in FIG. 4 for various operation temperatures of the fuel cell 11, a plurality of maps must be referred to for each temperature of the fuel cell 11. On the other hand, even when the current-voltage characteristic of the fuel cell 11 during normal operation shown with the curve a of FIG. 3 and the current-voltage characteristic during the low-efficiency operation shown by the curve b change, the air concentration overvoltage Ve, which is the difference between these curves, does not significantly change. Therefore, in the present embodiment, the air concentration overvoltage Ve is calculated, and the water blockage is determined based on the map between the air concentration overvoltage Ve and the air stoichiometric ratio, so that the calculation can be simplified and the efficiency of the calculation can be improved when the temperature of the fuel cell 11 is changed, compared to the embodiment described above with reference to FIGS. 1-5.

Figure 6:
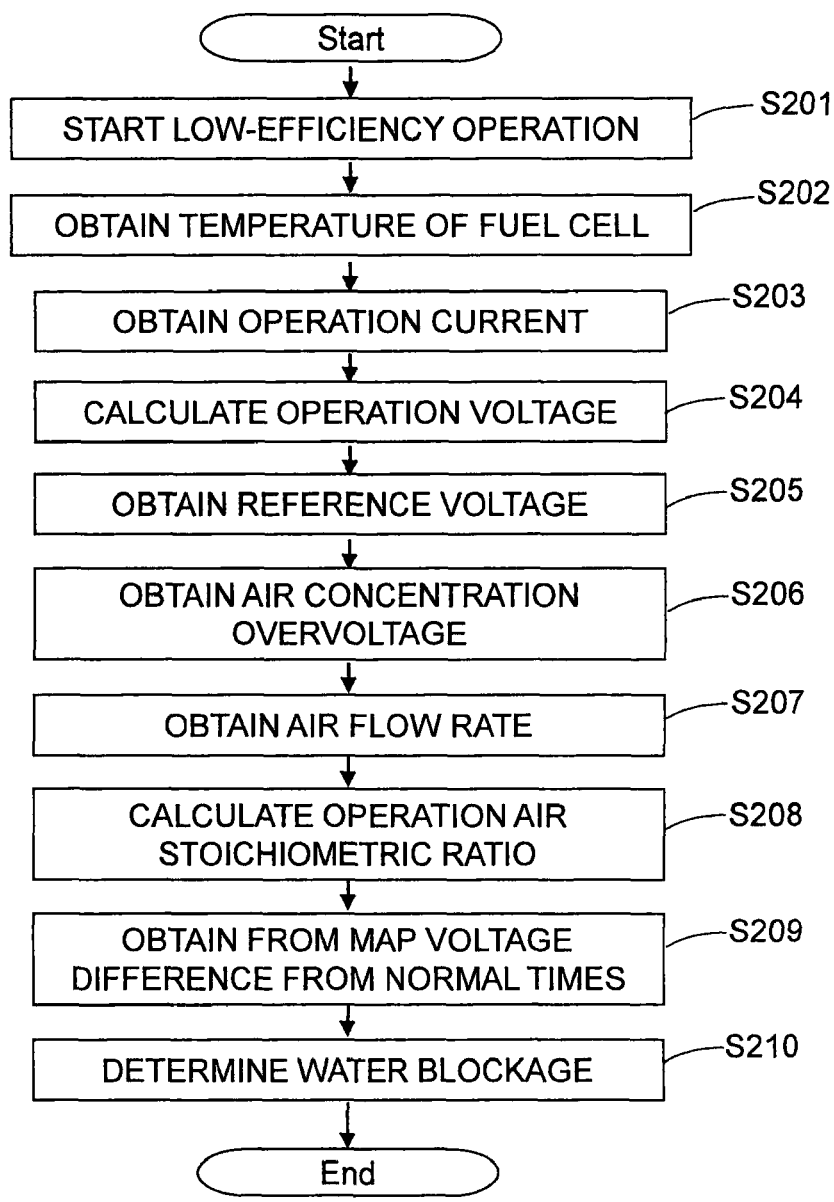
FIG. 6 is a flowchart showing another determination of water blockage in a fuel cell system according to a preferred embodiment of the present invention.

As shown in FIG. 6, after the controller 50 starts up the fuel cell system 100, as shown in step S201, the controller 50 starts the low-efficiency operation. The controller 50 obtains an operation temperature $T_1$ of the fuel cell 11 by the temperature sensor 31 shown in FIG. 1 as shown in step S202 of FIG. 6, obtains the operation current $I_1$ which is the output current of the fuel cell 11 by the current sensor 30 as shown in step S203 of FIG. 6, and obtains an operation voltage $V_1$ of the fuel cell 11 by the current sensor 29 as shown in step S204 of FIG. 6.

As shown in step S205 of FIG. 6, based on the obtained temperature of the fuel cell 11, the controller 50 selects one current-voltage characteristic from among a plurality of current-voltage characteristics during normal operation of the air stoichiometric ratio $S_0$ prepared in a memory for each temperature, and obtains a reference voltage $V_0$ at the operation current of $I_1$ and the operation temperature of $T_1$ based on the selected current-voltage characteristic and the obtained operation current $I_1$. Then, as shown in step S206 of FIG. 6 and in FIG. 3, the controller 50 subtracts the operation voltage $V_1$ of the fuel cell 11 from the obtained reference voltage $V_0$, to calculate the operation air concentration overvoltage $Ve_1$ when the operation current is $I_1$ and the temperature is $T_1$. As shown in step S207 of FIG. 6, the controller 50 obtains the intake air flow rate of the fuel cell system 100 by the air flow rate meter 14, and, as shown in step S208 of FIG. 6, calculates the operation air stoichiometric ratio $S_1$ by a method similar to that in the above-described embodiment.

As shown in FIG. 4, because the air concentration overvoltage $Ve_1$ is a difference between the reference voltage $V_0$ and the operation voltage $V_1$, as the air stoichiometric ratio is reduced, the air concentration overvoltage is increased and reaches near the reference voltage $V_0$, and, as the air stoichiometric ratio is increased, the air concentration overvoltage is reduced, and becomes 0 at the air stoichiometric ratio of $S_0$ in normal operation. When the air stoichiometric ratio is changed while fixing the output current from the fuel cell 11 at the operation current $I_1$, the air concentration overvoltage Ve becomes an S-shape curve with a gradual rise shown by curves h to j of dot-and-chain lines as shown in FIG. 7, in which the fall is smaller than the curve g showing the change of the air concentration overvoltage Ve in a state of no water blockage. The air concentration overvoltage Ve shows a change closer to the curve j as the degree of the water blockage is increased, and the air concentration overvoltage Ve shows a change closer to the curve h as the degree of water blockage is reduced.

Figure 7:
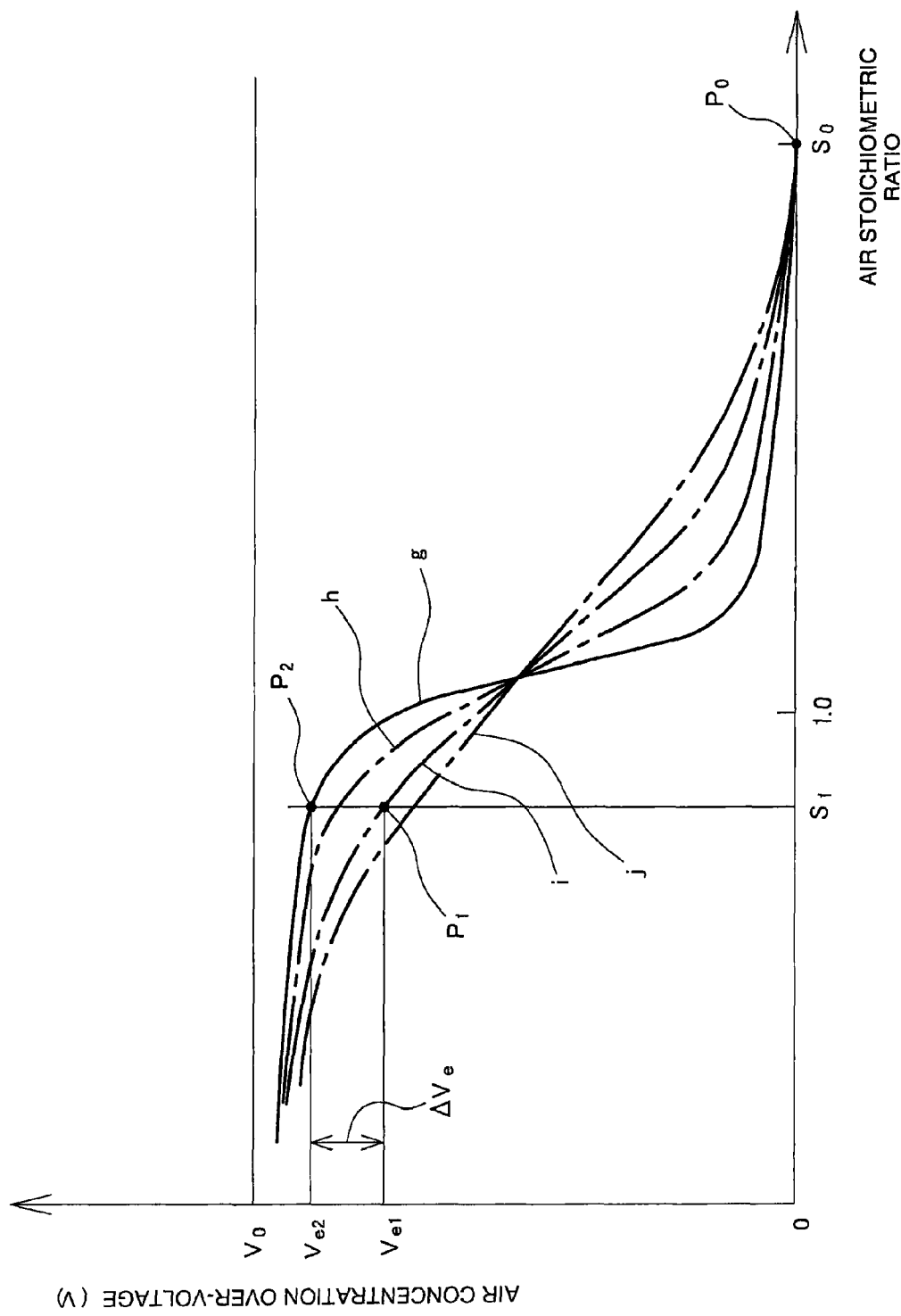
FIG. 7 is a graph showing a change of an air concentration overvoltage corresponding to an air stoichiometric ratio in a fuel cell system according to a preferred embodiment of the present invention.

As shown in FIG. 7, when the water blockage occurs, the air concentration overvoltage Ve changes in the above-described manner. Therefore, in a region where the air stoichiometric ratio is less than a value near 1.0, if the fuel cell 11 is operated with the output current from the fuel cell 11 fixed at the operation current $I_1$, as the degree of the water blockage is increased, the operation air concentration overvoltage $Ve_1$ becomes lower from the air concentration overvoltage $Ve_2$ in the normal state where there is no water blockage. On the other hand, when the air stoichiometric ratio is larger than a value near 1.0 and the fuel cell is operated in a state where the air stoichiometric ratio is lower than the air stoichiometric ratio $S_0$ during the normal operation, the operation air concentration overvoltage $Ve_1$ becomes higher than in the case without the water blockage. At the same air stoichiometric ratio, the voltage difference $\Delta Ve$ between the operation air concentration overvoltage $Ve_2$ in the normal state without the water blockage and the operation air concentration overvoltage $Ve_1$ in the case where the water blockage has occurred becomes larger as the degree of water blockage becomes larger.

When the controller 50 completes obtaining the operation air concentration overvoltage $Ve_1$ and calculating the operation air stoichiometric ratio $S_1$, as shown in step S209 of FIG. 6, the controller 50 obtains a voltage difference $\Delta Ve$ between the air concentration overvoltage $Ve_2$ in the normal state and the operation air concentration overvoltage $Ve_1$ at a point where the air stoichiometric ratio is the operation air stoichiometric ratio $S_1$ in the map shown in FIG. 7. As shown in step S210 of FIG. 6, when the obtained voltage difference $\Delta Ve$ is larger than a predetermined threshold value, it is determined that the water blockage has occurred, and, when the voltage difference $\Delta Ve$ is not larger than the predetermined threshold value, it is determined that the water blockage has not occurred. Alternatively, the degree of the water blockage of the air flow path may be determined based on the magnitude of the voltage difference $\Delta Ve$. The degree of water blockage may be determined, for example, by setting a plurality of levels of water blockage levels corresponding to the voltage difference $\Delta Ve$ and outputting one of the water blockage levels.

In the above-described preferred embodiment, in addition to the advantages of the preferred embodiment described above with reference to FIGS. 1-5, there can be obtained advantages that the water blockage can be determined with fewer maps, and the control can be simplified.

Next, an air blow operation performed when the water blockage occurs during the low-efficiency operation will be described with reference to FIGS. 8 and 9. The portions similar to those described above with reference to FIGS. 1-7 will not be described again.

Figure 8:
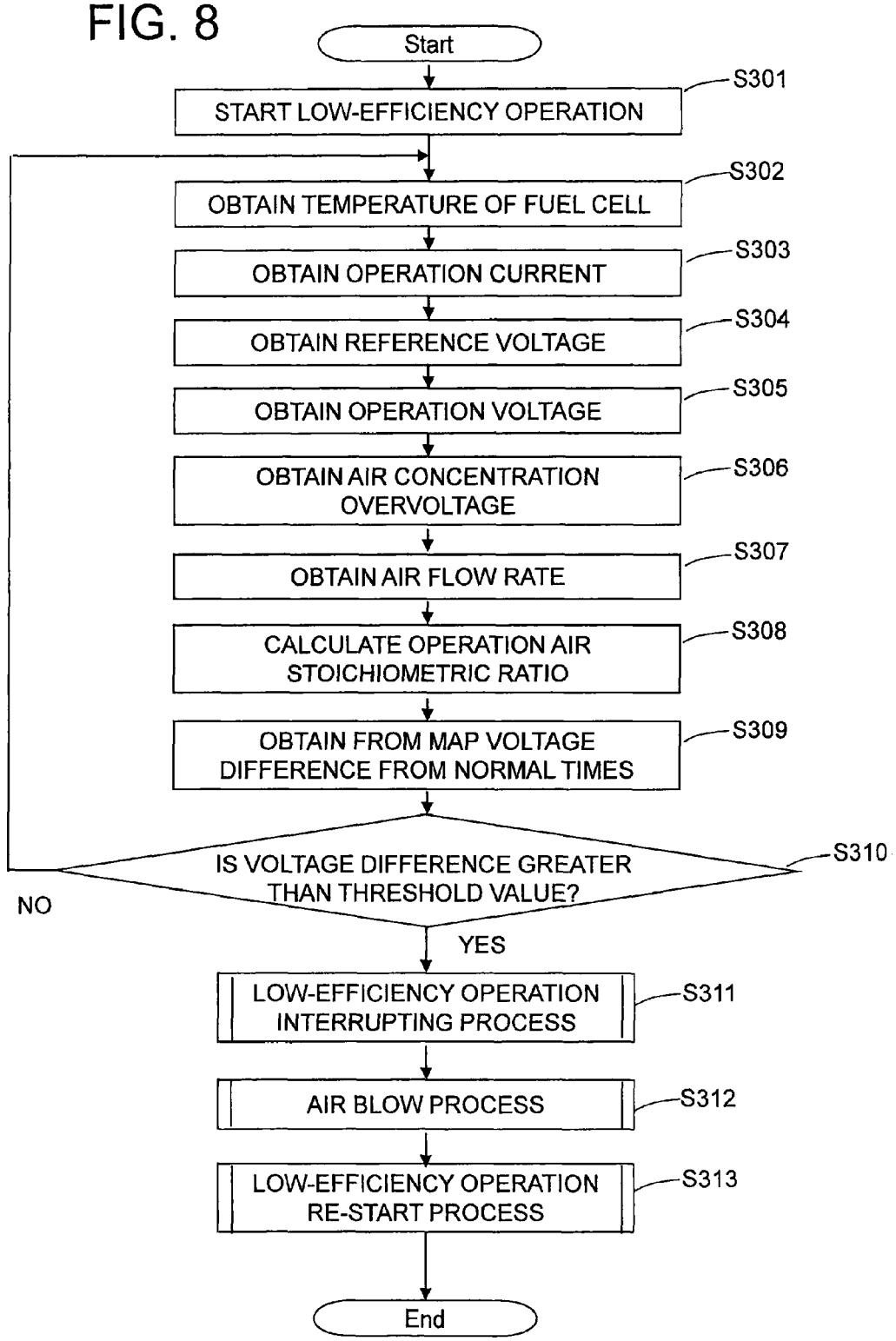
FIG. 8 is a flowchart of an air blow operation in a fuel cell system according to a preferred embodiment of the present invention.

As shown in steps S301-S309 of FIG. 8, the controller 50 obtains the voltage difference $\Delta Ve$ between the air concentration overvoltage $Ve_2$ in the normal state and the operation air concentration overvoltage $Ve_1$ when the air stoichiometric ratio is the operation air stoichiometric ratio $S_1$, in steps similar to those of the embodiment described above with reference to FIGS. 6 and 7. As shown in step S310 of FIG. 8, it is determined whether or not the obtained voltage difference $\Delta Ve$ is larger than a predetermined threshold value, and, when the voltage difference $\Delta Ve$ is larger than the predetermined threshold value, it is determined that the degree of water blockage is large, and the air blow process is necessary. As shown in step S311 of FIG. 8, the controller 50 executes a low-efficiency operation interrupting process. When, on the other hand, the obtained voltage difference $\Delta Ve$ is less than the predetermined threshold value, the process returns to step S302 of FIG. 8, and monitoring of the water blockage is continued.

Figure 9:
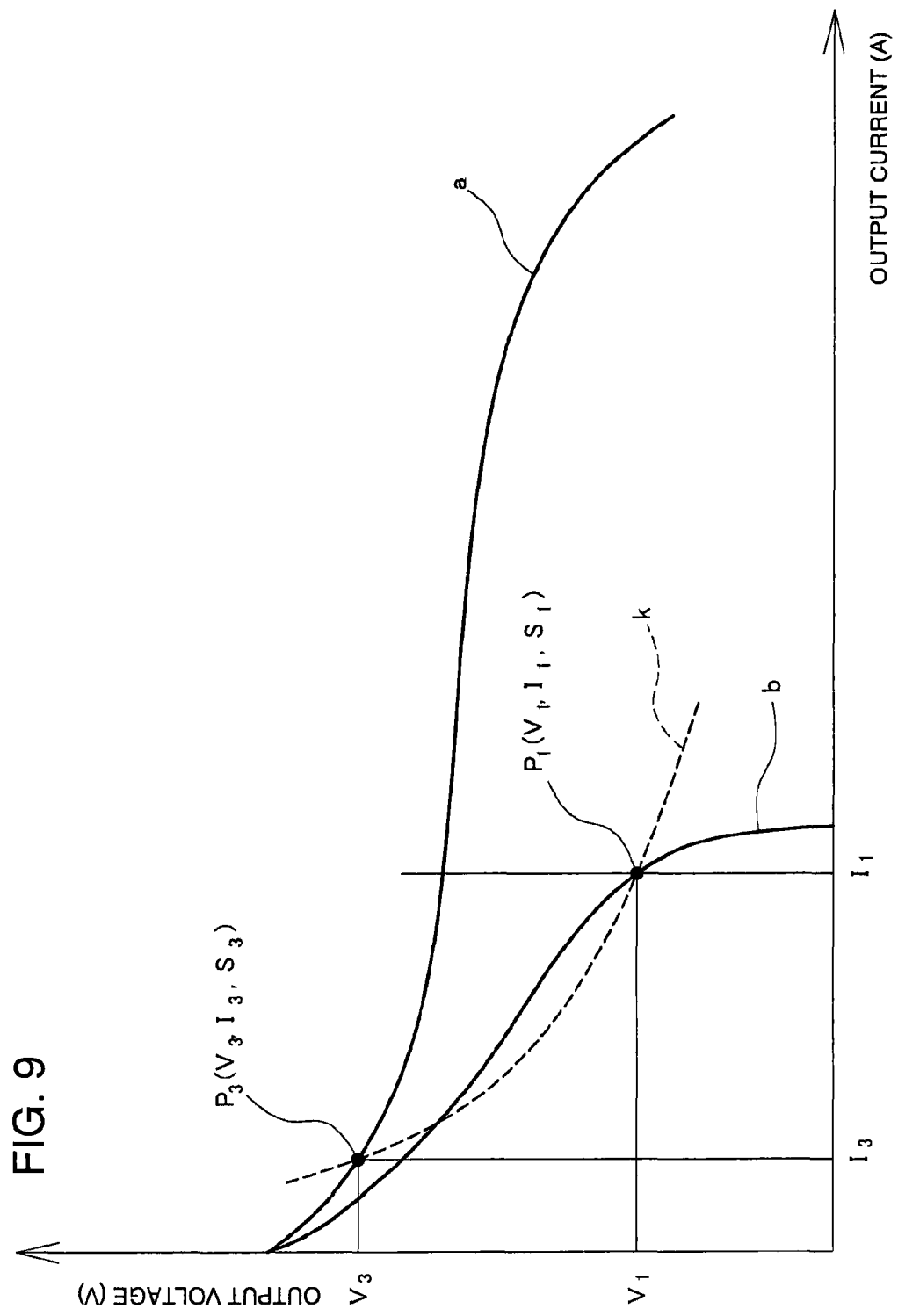
FIG. 9 is an explanatory diagram showing a change of an operation point of a fuel cell during an air blow operation in a fuel cell system according to a preferred embodiment of the present invention.

As shown in FIG. 9, during the low-efficiency operation, the fuel cell 11 is operated with the operation voltage of $V_1$ and the operation current of $I_1$ on the curve b showing the current-voltage characteristic. If the air flow rate is increased in this state, because the current-voltage characteristic of the fuel cell would change toward the curve a showing the current-voltage characteristic in normal operation, the current would be increased and power in an amount greater than that required by the load may be output if the operation voltage $V_1$ is maintained constant.

In consideration of this, the controller 50 first increases the voltage of the load 32, to increase the operation voltage of the fuel cell 11 from $V_1$, and also adjusts a rotational rate of the motor 13 of the air compressor 12 to adjust the amount of supply of air so that the output current of the fuel cell 11 changes along an equi-output curve k shown by a dotted line in FIG. 9. The controller 50 moves the operation point of the fuel cell 11 from the operation point $P_1$ with the operation voltage of $V_1$, the operation current of $I_1$, and the operation air stoichiometric ratio of $S_1$, along the equi-output curve k, to an operation point $P_3$ on the curve a showing the voltage-current characteristic in normal operation. At the operation point $P_3$, the fuel cell 11 is operated with an operation voltage of $V_3$, an operation current of $I_3$, and an operation air stoichiometric ratio of $S_3$. Because the operation point $P_3$ is an operation point on the curve a of the current-voltage characteristic in normal operation, the operation point $P_3$ is an operation point in which, for example, the output voltage changes along the curve a when the current changes, but the output voltage and the outpour current of the fuel cell 11 do not change even when the air flow rate is changed. In this manner, the controller 50 interrupts the low-efficiency operation by increasing the operation voltage $V_1$ of the fuel cell 11 and moving the operation point to an operation point on the curve a showing the current-voltage characteristic in normal operation.

After the controller 50 interrupts the low-efficiency operation, as shown in step s312 of FIG. 8, the controller 50 increases a rotational rate of the motor 13 of the air compressor 12 to increase a flow rate of air to the fuel cell 11, to thereby blow the water residing in the air flow path. The air flow rate may be set to the maximum air flow rate of the air compressor 12 or may be increased to a predetermined value which is set separately.

As shown in step S313 of FIG. 8, when the air blow process is completed, the controller 50 re-starts the low-efficiency operation. The controller 50 reduces the voltage of the load 32 to reduce the output current of the fuel cell 11 so that the output voltage and the output current of the fuel cell 11 move along the equi-output curve k and also adjusts the air flow rate and the air stoichiometric ratio so that the output current changes along the equi-output curve k, in a manner opposite that for the transition from the operation point $P_1$ of low-efficiency operation to the operation point $P_3$ on the curve a of the current-voltage characteristic in normal operation. The controller 50 thus returns the operation point of the fuel cell 11 to the operation point $P_1$ of low-efficiency operation, and continues the low-efficiency operation and monitoring water blockage. When the voltage difference $\Delta Ve$ becomes larger than the predetermined threshold value during the low-efficiency operation, the controller 50 again applies the air blow process.

The present embodiment has an advantage that the low-efficiency operation can be stably continued because the water blockage is determined during the low-efficiency operation and the air blow process in the air flow path is executed based on the determination.

Next, a dilution process of pumping hydrogen produced during the low-efficiency operation will be described. Before the operation of the fuel cell system 100 is explained, production of the pumping hydrogen will be described. A theoretical amount of production of the pumping hydrogen $W_{H0}$ produced in the fuel cell 11 is described by the following formula.

$$W_{H0} = (1-S_1) \times I_1 \times n/(2 \times F) \times 22.4 \times 60$$

wherein:
$W_{H0}$ denotes a theoretical amount of production of pumping hydrogen;
$S_1$ denotes an operation air stoichiometric ratio;
$I_1$ denotes the operation current of the fuel cell;
F denotes the Faraday coefficient; and
n denotes number of cells.

Figure 11:
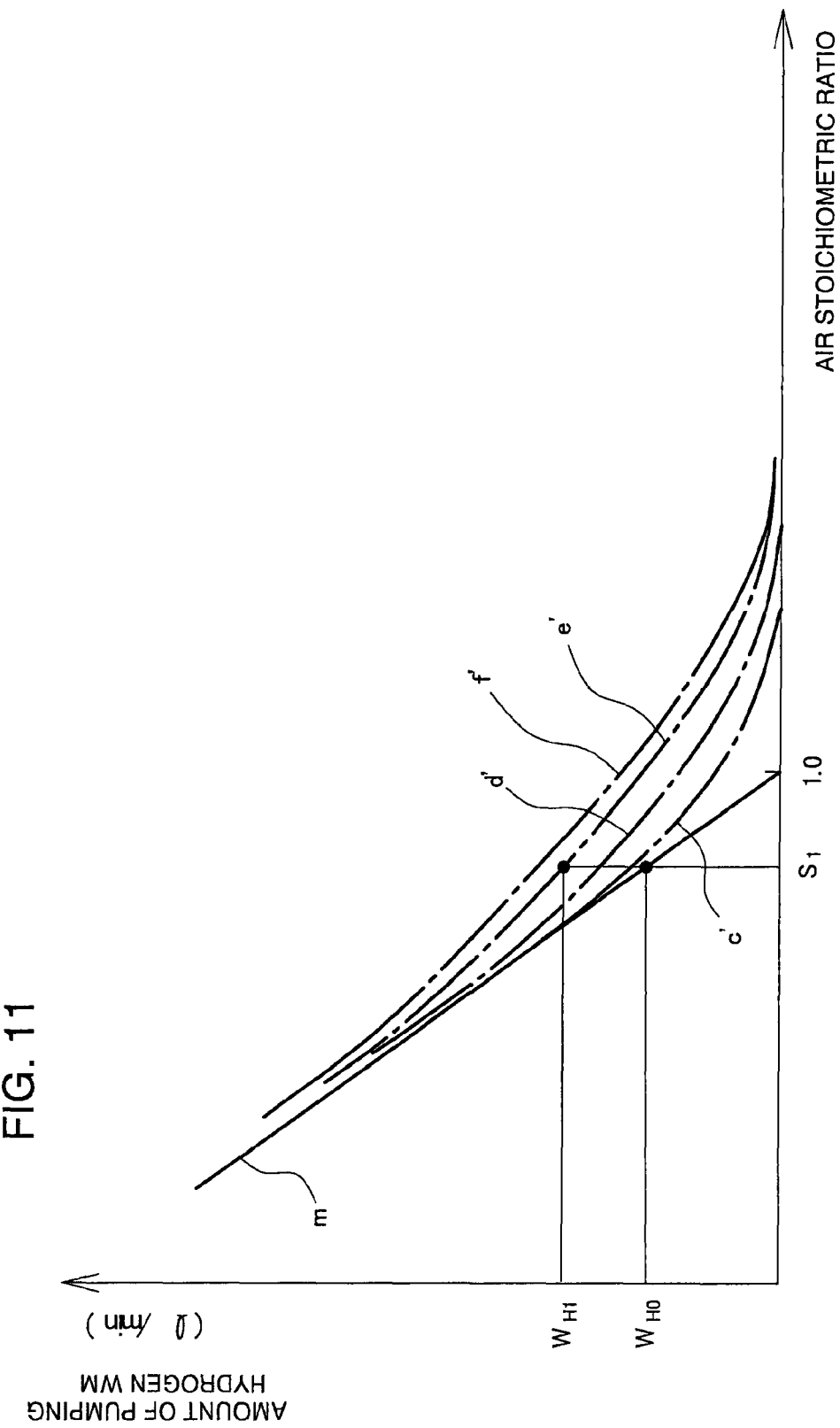
FIG. 11 is a graph showing a change of an amount of pumping hydrogen corresponding to an air stoichiometric ratio in a fuel cell system according to a preferred embodiment of the present invention.
Figure 12:
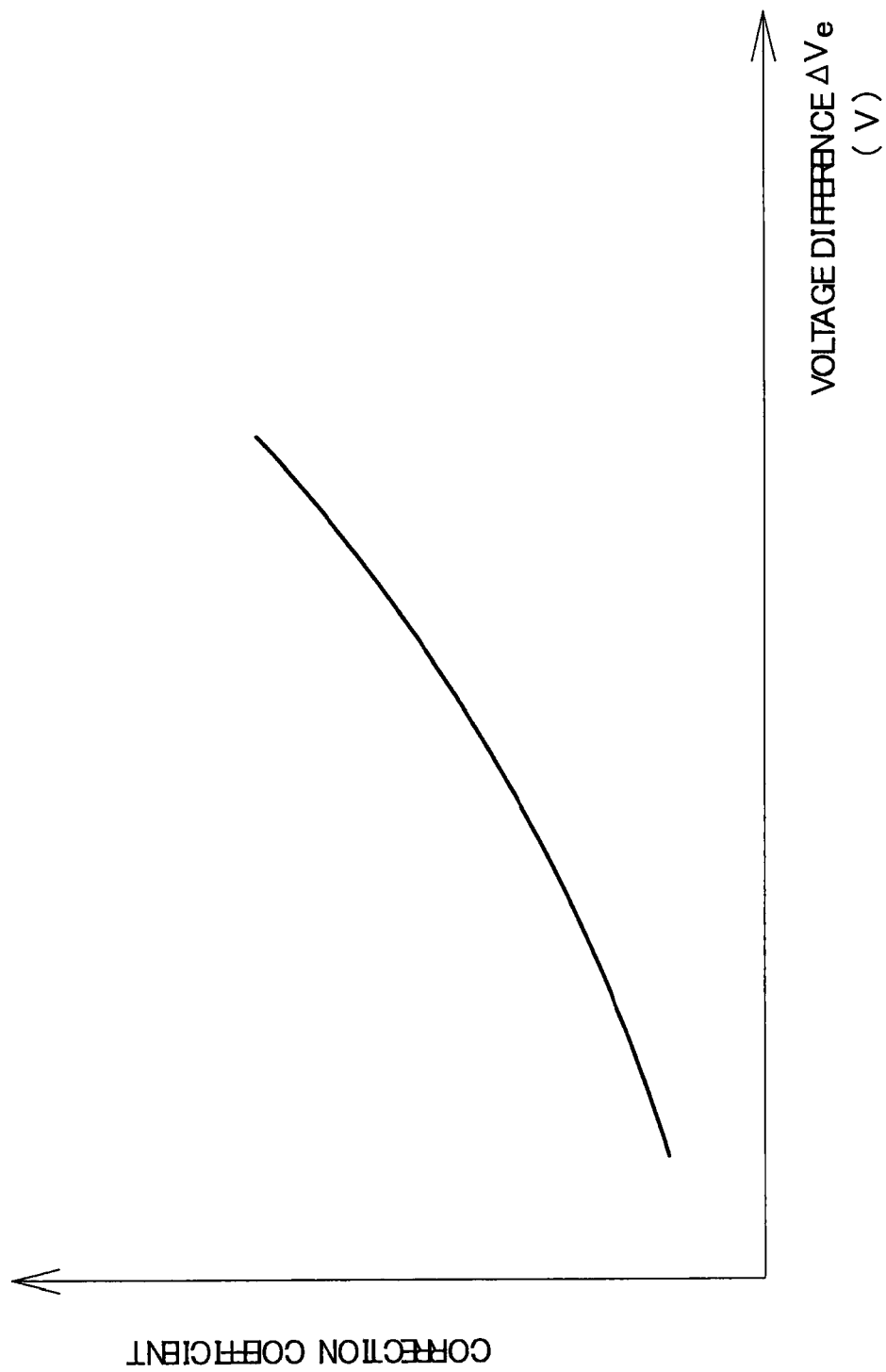
FIG. 12 is a graph showing a change of a correction coefficient of an amount of pumping hydrogen corresponding to a voltage difference $\Delta Ve$ between an air concentration overvoltage $Ve_2$ in a normal state and an operation air concentration overvoltage $Ve_1$ in a fuel cell system according to a preferred embodiment of the present invention.

In other words, theoretically, the pumping hydrogen is produced in proportion to the operation current $I_1$ of the fuel cell 11 when the air stoichiometric ratio becomes less than or equal to 1.0, and can be calculated based on the operation current $I_1$ of the fuel cell 11 and the operation air stoichiometric ratio $S_1$. However, as already described with reference to FIG. 5(a), because there is a variation in the pressure loss ratio among cells, even when the air stoichiometric ratio of the fuel cell 11 as a whole is greater than or equal to 1.0, the air flow rate may be insufficient, depending on the cell, and a situation may occur where the single cell has an air stoichiometric ratio which is less than 1.0, resulting in production of the pumping hydrogen in this cell. When water blockage occurs in the air flow path, the variation of the pressure loss ratio among the cells becomes larger, and thus, the number of cells where the pumping hydrogen is produced due to the insufficiency in the air flow rate is increased. Because of this, as shown by curves c' to f' of FIG. 11, when the degree of water blockage becomes large, the amount of production of pumping hydrogen is increased. The curves c' to f' are curves showing the amount of production of the pumping hydrogen for the degrees of water blockage corresponding to the degrees of water blockage of curves c to d of FIG. 4 and curves h to j of FIG. 7. As shown in FIG. 11, when the degree of water blockage becomes larger, the amount of production of pumping hydrogen becomes larger than the theoretical amount of production $W_{H0}$. In addition, because the voltage difference $\Delta Ve$ between the air concentration overvoltage $Ve_2$ in the normal state and the operation air concentration overvoltage $Ve_1$ for the operation air stoichiometric ratio of $S_1$ described above with reference to FIGS. 6 and 7 is increased when the degree of water blockage becomes larger, the characteristic curve of the amount of production of the pumping hydrogen with respect to the theoretical amount of production $W_{H0}$ would be that shown in FIG. 12, based on the voltage difference $\Delta Ve$. The controller 50 stores the map shown in FIG. 12 in a memory.

Figure 10:
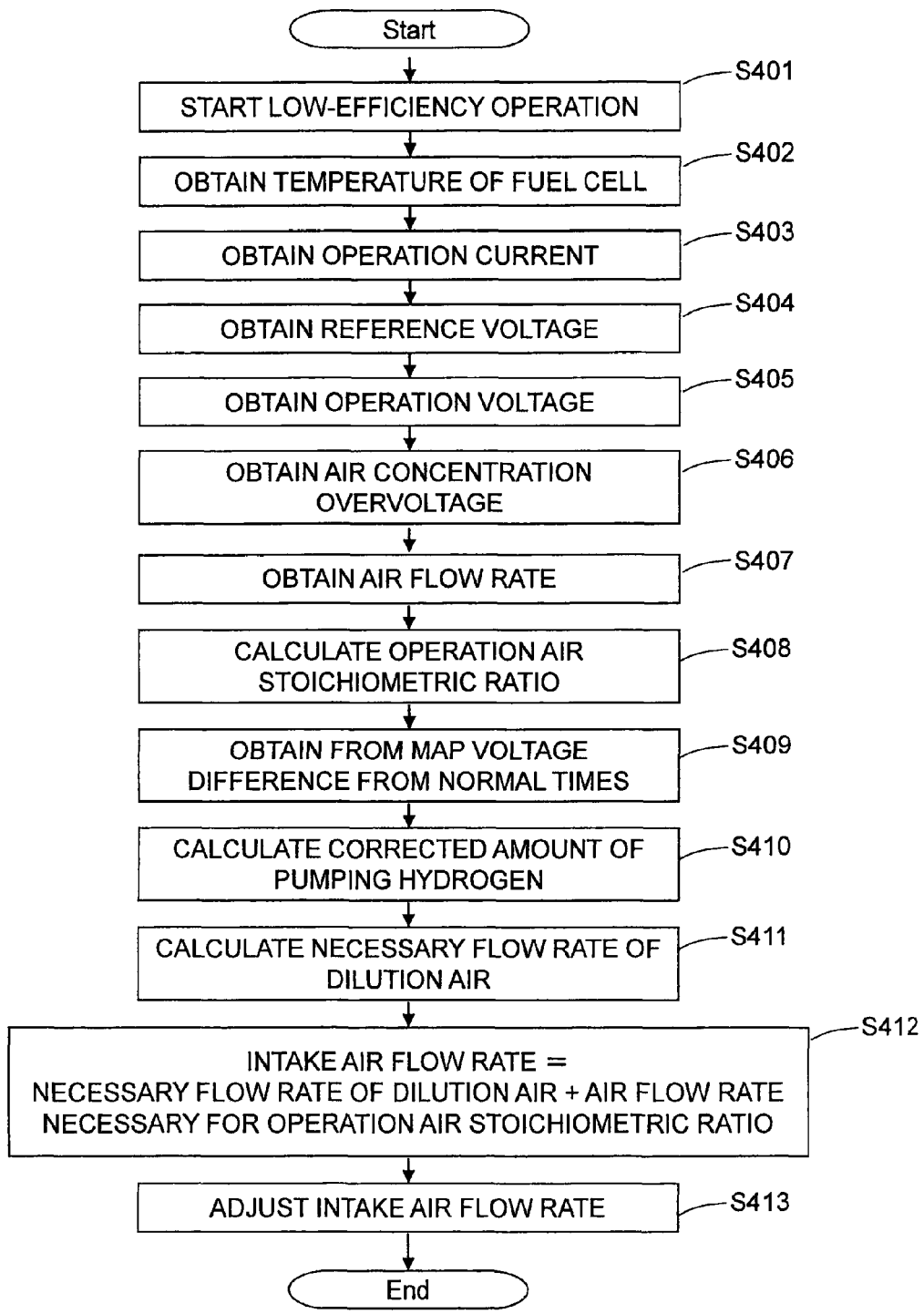
FIG. 10 is a flowchart of calculation of a flow rate of dilution air in a fuel cell system according to a preferred embodiment of the present invention.

Next, an operation of the dilution process of the pumping hydrogen will be described with reference to FIGS. 10 and 11. As shown in steps S401 to S409 of FIG. 10, the controller 50 obtains the voltage difference $\Delta Ve$ between the air concentration overvoltage $Ve_2$ in the normal state and the operation air concentration overvoltage $Ve_1$ when the air stoichiometric ratio is the operation air stoichiometric ratio $S_1$ in steps similar to those of the embodiment described above with reference to FIGS. 6 and 7. As shown in step S410 of FIG. 10, the controller 50 obtains a correction coefficient with respect to the theoretical amount of production of pumping hydrogen $W_{H0}$ from the map shown in FIG. 12, and multiplies the theoretical amount of production $W_{H0}$ and the correction coefficient, to calculate a corrected amount of pumping hydrogen. As shown in step S411 of FIG. 10, the controller 50 divides the corrected amount of pumping hydrogen by a dilution hydrogen concentration, to calculate a necessary dilution air flow rate. The controller 50 sets an air flow rate obtained by adding the necessary dilution air flow rate and the air flow rate necessary for the operation air stoichiometric ratio $S_1$ of the low-efficiency operation of the fuel cell 11, as an intake air flow rate, and, as shown in step S413 of FIG. 10, the controller 50 increases the rotational rate of the motor 13 of the air compressor 12, to increase the intake air flow rate. The controller 50 opens the bypass valve 15, to allow flow of the increased amount of air not to the fuel cell 11, but through the bypass passage 19 to the exhaust passage 20, so that the hydrogen gas concentration of the discharge air is set to less than or equal to a predetermined dilution concentration while maintaining the low-efficiency operation of the fuel cell 11.

The present embodiment has an advantage that the low-efficiency operation can be stably continued because there can be inhibited the increase in the discharge hydrogen concentration due to pumping hydrogen which is increased according to the degree of water blockage during the low-efficiency operation.

EXPLANATION OF REFERENCE NUMERALS

11 FUEL CELL; 12 AIR COMPRESSOR; 13 MOTOR; 14 AIR FLOW RATE METER; 15 BYPASS VALVE; 16 AIR INTAKE PASSAGE; 17 AIR SUPPLY PASSAGE; 18 AIR DISCHARGE PASSAGE; 19 BYPASS PASSAGE; 20 EXHAUST PASSAGE; 21 HYDROGEN GAS TANK; 22 HYDROGEN SUPPLY PASSAGE; 23 HYDROGEN PUMP; 24 HYDROGEN EXIT PASSAGE; 25 HYDROGEN CIRCULATION PASSAGE; 26 HYDROGEN DISCHARGE PASSAGE; 27 ATMOSPHERE DISCHARGE OUTLET; 28 HYDROGEN DISCHARGE VALVE; 29 VOLTAGE SENSOR; 30 CURRENT SENSOR; 31 TEMPERATURE SENSOR; 32 LOAD; 50 CONTROLLER; 100 FUEL CELL SYSTEM

The invention claimed is:

1. A fuel cell system comprising:
a fuel cell which generates power by an electrochemical reaction between air supplied to an oxidant gas flow path and hydrogen supplied to a fuel gas flow path;
an air flow rate obtaining unit which obtains a flow rate of the air supplied to the oxidant gas flow path;
a voltage sensor which obtains an actual operation voltage of the fuel cell;
a current sensor which obtains an operation current of the fuel cell; and
a controller, including a computer which executes signal processing and a memory which stores a control program, which adjusts an amount of the air supplied to the fuel cell, wherein the controller, for use during a low-efficiency operation in which the stoichiometric ratio of the air is reduced from a stoichiometric ratio of the air during a normal operation and heat discharged from the fuel cell is increased from that during the normal operation, is programmed to:
calculate the actual stoichiometric ratio of the air based on the flow rate of the air obtained by the air flow rate obtaining unit with an actual stoichiometric ratio calculating unit;
calculate a theoretical amount of pumping hydrogen based on the actual stoichiometric ratio of the air and the operation current of the fuel cell, and corrects the theoretical amount of pumping hydrogen based on a correction coefficient determined in accordance with a voltage difference between a voltage of the fuel cell in a normal state with no water blockage corresponding to the actual stoichiometric ratio of the air and the actual operation voltage of the fuel cell to obtain a corrected amount of pumping hydrogen with a pumping hydrogen amount correcting unit;
calculate a necessary amount of dilution air based on the corrected amount of pumping hydrogen obtained by the pumping hydrogen amount correcting unit with a necessary air flow calculating unit; and
increase the air flow rate to the necessary flow rate of dilution air calculated by the necessary air amount calculating unit with an air flow increasing unit.

2. The fuel cell system according to claim 1, further comprising:
a temperature sensor which obtains a temperature of the fuel cell,
wherein
the controller further programmed to:
calculate a reference current-voltage characteristic of the fuel cell based on the temperature of the fuel cell obtained by the temperature sensor during the low-efficiency operation with a reference current-voltage characteristic calculating unit;
calculate a reference voltage corresponding to the operation current of the fuel cell obtained by the current sensor, based on the reference current-voltage characteristic, and calculates an oxidant concentration overvoltage by subtracting the actual operation voltage of the fuel cell from the calculated reference voltage during the low-efficiency operation with an oxidant concentration overvoltage calculating unit;
determine the degree of obstruction of the oxidant gas flow path based on a voltage difference between the reference oxidant concentration overvoltage of the fuel cell in the normal state with no water blockage corresponding to the actual stoichiometric ratio of the air and the oxidant concentration overvoltage during the low-efficiency operation with the obstruction degree determining unit; and
execute, when the degree of obstruction is greater than a predetermined threshold value, a blow operation in which, after the voltage of the fuel cell is increased to transition from the low-efficiency operation to a normal operation, the flow rate of the oxidant gas is increased with an oxidant gas flow path blowing unit.

3. The fuel cell system according to claim 1, wherein the controller is further programmed to:
determine the degree of obstruction of the oxidant gas flow path based on the voltage difference between the voltage of the fuel cell in the normal state with no water blockage corresponding to the actual stoichiometric ratio of the air and the actual operation voltage of the fuel cell during the low-efficiency operation with an obstruction degree determining unit; and
executes, when the degree of obstruction is greater than a predetermined threshold value, a blow operation in which, after the voltage of the fuel cell is increased to transition from the low-efficiency operation to a normal operation, the flow rate of the air is increased with an oxidant gas flow path blowing unit.

4. The fuel cell system according to claim 3, wherein the obstruction degree determining unit determines the degree of obstruction of the oxidant gas flow path according to the degree of increase of the actual operation voltage of the fuel cell compared to the voltage of the fuel cell in the normal state with no water blockage corresponding to the actual stoichiometric ratio of the air when the stoichiometric ratio of the air is less than 1.0.

5. The fuel cell system according to claim 4, wherein
the obstruction degree determining unit determines the degree of obstruction of the oxidant gas flow path according to the degree of reduction of the oxidant concentration overvoltage calculated by the oxidant concentration overvoltage calculating unit compared to the reference oxidant concentration overvoltage of the fuel cell in the normal state with no water blockage corresponding to the actual stoichiometric ratio of the air when the stoichiometric ratio of the air is less than 1.0.

* * * * *